March 25, 1924.  
E. S. B. MACKENZIE-HUGHES  
1,488,019  
SPOKE SOCKET  
Filed July 5, 1921
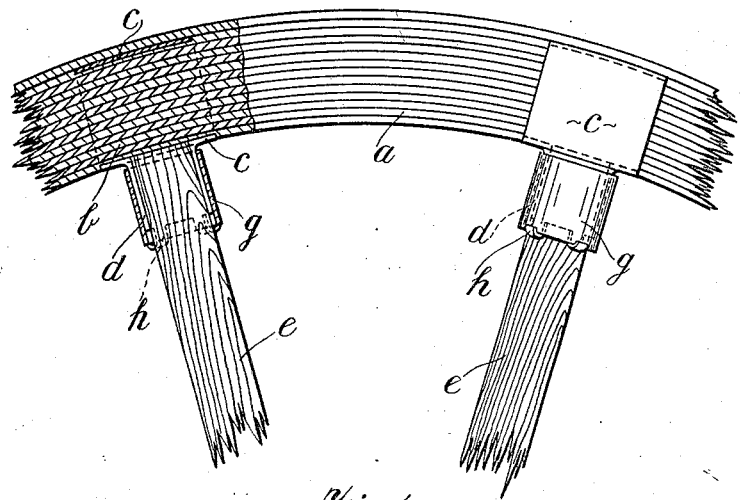
Fig.1
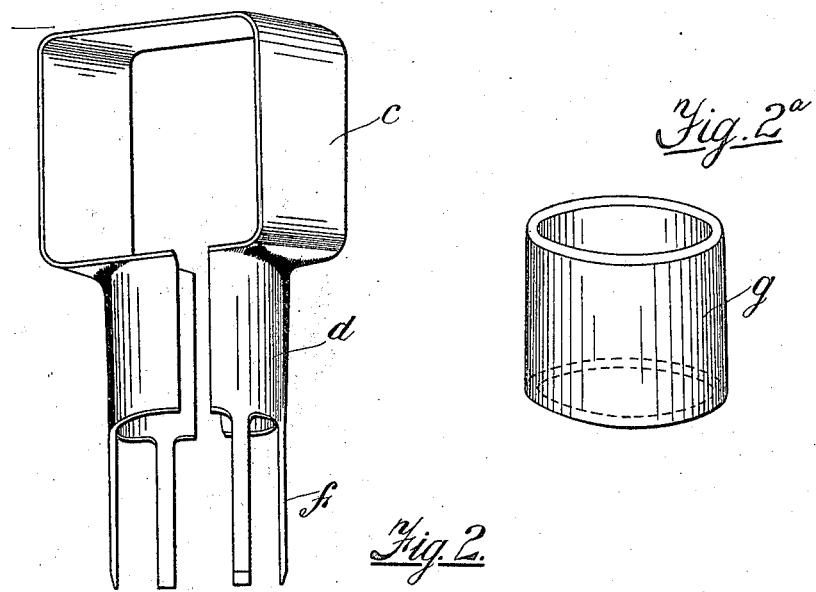
Fig.2  Fig.2ᵃ
Inventor  
Edward Sinclair B. Mackenzie-Hughes  
by B. Singer  
Atty Patented Mar. 25, 1924.

1,488,019

UNITED STATES PATENT OFFICE.

EDWARD SINCLAIR BREMNER MACKENZIE-HUGHES, OF DULWICH, LONDON, ENGLAND.

SPOKE SOCKET.

Application filed July 5, 1921. Serial No. 482,585.

*To all whom it may concern:*

Be it known that I, EDWARD SINCLAIR BREMNER MACKENZIE-HUGHES, a subject of the King of Great Britain, residing at 17 Wkyeham Mansions, Rosendale Road, Dulwich, London S. E. 21, England, have invented a new and useful Improved Spoke Socket, of which the following is a specification.

This invention relates to vehicle wheels of the kind in which a metal tyre is shrunk on to a wooden felloe and has more especial reference to wheels used for artillery purposes. Hitherto wheels of this kind have been built up by securing the felloe together in lengths by tongue and groove or similar joints and by passing the outer ends of the spokes of reduced diameter through the body of the felloe. This construction possesses the disadvantage that the felloe is weakened by boring it out for the necessary securing arrangements and the wheel in use is consequently liable to break when any unusual strain is placed upon it.

The object of the present invention is to provide an improved construction applicable more especially to artillery wheels in which no boring of the felloe is necessary to secure the spokes in place and in which no bolts, rivets, screws or fastening means of a like kind are employed in securing the felloe together or in attaching the spokes thereto.

According to the invention a vehicle wheel is provided wherein the spokes are secured to a laminated wooden felloe by clips passed around felloe and spokes in such a manner that piercing of the felloe is avoided. Each clip besides passing around the felloe is formed with a socket adapted to receive the end of a spoke. A locking tube is passed over this socket on assembly and is retained in locking position by longitudinal extensions on the socket which are caused to engage the edge of the tube. The felloe is constructed preferably of spiral laminations secured together with a waterproof glue.

The invention is illustrated by way of example in the accompanying drawings in which:—

Figure 1 is an elevation partly in section of a portion of a wheel constructed in accordance with the invention.

Figure 2 is a perspective view of one of the clips and locking tubes employed to secure the spokes to the felloe and Figure 2ª is a detail view of the locking tube.

The felloe $a$ is built up of wooden laminations which may be if desired of alternate grain each lamination being glued to the adjacent ones by a suitable waterproof glue or other suitable adhesive.

At the points of attachment of the spokes to the felloe the latter is formed of reduced cross sectional area as shown at $b$, Figure 1 in order that a metal clip $c$ may be flush with the surface of the felloe $a$ and relative circumferential movement of the clip to the felloe be prevented. Each clip $c$ comprises a portion conforming in shape with the felloe and passing completely around the latter at the points $b$. The ends of the clip are bent to form a split tubular socket $d$ to receive the outer end of a spoke $e$ whilst depending from the socket $d$ and integral therewith are a number of metal strips $f$, four being the number most convenient to employ.

Before inserting the spoke end $e$ (which is shown as circular in cross section but which may be of oval or other form with a corresponding alteration in the shape of socket $d$) in the socket $d$ a locking tube $g$ is passed over the spoke. This locking tube is of circular or other cross section according to the shape of the spoke.

The clip $c$, socket $d$ and strips $f$ are all formed from one piece of sheet metal by hydraulic pressure or other suitable means into the shape shown in Figure 2 and the two portions are forced apart to pass the clip around the felloe $a$. When the clip $c$ has been positioned thus, the spoke $e$ is butted home in the socket $d$ against the inner surface of the felloe $a$ and the locking tube $g$ is caused to slide over the socket $d$, the outer surface of which is preferably slightly tapered to ensure a tight engagement between locking tube and socket and the latter and the spoke. The strips $f$ are then bent outward and upward to form hooks $h$ around the lower edge of the locking tube $g$ which is thereby prevented from displacement. After bending in the manner described the strips $f$ are reduced in length.

By the above arrangement the spoke is held closely in engagement with the felloe, the engagement between the socket and spoke and the upturned ends of the strips which may be sunk or partially sunk into the substance of the spoke combining to prevent displacement whilst neither felloe nor spokes are weakened by any securing means passing through them at the point of attachment.

The tyre may be shrunk into position upon the felloe.

I claim:—

1. In a vehicle wheel a felloe, spokes, clips engaging said felloe and having inwardly extending longitudinally split sockets receiving the outer ends of said spokes, locking tubes surrounding said sockets and tightly wedged thereon, and strips formed on said sockets and engaging over said locking tubes.

2. In a vehicle wheel, a felloe, spokes, clips engaging said felloe and having inwardly extending longitudinally split sockets receiving the outer ends of said spokes and having inner edges, locking tubes surrounding said sockets and tightly wedged thereon and having inwardly facing edges and strips formed on the inner edges of said sockets, bent over the inwardly facing edges of said locking tubes and reduced in length by cutting.

3. In a vehicle wheel a felloe, spokes, clips engaging said felloe and having inwardly extending longitudinally split sockets receiving the outer ends of said spokes and having inner edges, locking tubes surrounding said sockets and tightly wedged thereon and having inwardly facing edges, and strips formed on the inner edges of said sockets, bent over the inwardly facing edges of said locking tubes.

In witness whereof I affix my signature.

EDWARD SINCLAIR BREMNER
MACKENZIE-HUGHES.